(12) United States Patent
Watanabe

(10) Patent No.: US 11,650,572 B2
(45) Date of Patent: May 16, 2023

(54) REMOTE MANAGEMENT SYSTEM, CONTROL DEVICE, SERVER, METHOD, AND RECORDING MEDIUM

(71) Applicant: NEC Corporation, Tokyo (JP)

(72) Inventor: Kazuteru Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1006 days.

(21) Appl. No.: 16/469,798

(22) PCT Filed: Dec. 13, 2017

(86) PCT No.: PCT/JP2017/044648
§ 371 (c)(1),
(2) Date: Jun. 14, 2019

(87) PCT Pub. No.: WO2018/116920
PCT Pub. Date: Jun. 28, 2018

(65) Prior Publication Data
US 2019/0384265 A1    Dec. 19, 2019

(30) Foreign Application Priority Data

Dec. 21, 2016  (JP) .............................. JP2016-247460

(51) Int. Cl.
*G05B 19/4155*      (2006.01)
*H04B 7/14*         (2006.01)
(Continued)

(52) U.S. Cl.
CPC ........... *G05B 19/4155* (2013.01); *H04B 7/14* (2013.01); *H04H 60/50* (2013.01); *H04L 12/66* (2013.01);
(Continued)

(58) Field of Classification Search
CPC ...... G05B 19/4155; G05B 2219/23051; H04B 7/14; H04B 3/36; H04H 60/50;
(Continued)

(56) References Cited

U.S. PATENT DOCUMENTS

2011/0238855 A1* 9/2011 Korsunsky .......... H04L 63/1441
709/231
2012/0191846 A1   7/2012 Ikuma
(Continued)

FOREIGN PATENT DOCUMENTS

JP    2006-121533 A    5/2006
JP    2006-309297 A    11/2006
(Continued)

OTHER PUBLICATIONS

International Search Report of PCT/JP2017/044648 dated Mar. 6, 2018.

*Primary Examiner* — Abdullahi Ahmed
(74) *Attorney, Agent, or Firm* — Sughrue Mion, PLLC

(57) ABSTRACT

A remote management system includes: a facility information receiver that receives facility information representing a facility within a space; a facility information storage that stores the facility information; a use information receiver that receives use information representing a facility to be operated during a use period of the space among facilities represented by the facility information; a use information storage that stores the use information; a relay that relays communication between the facility within the space and an outside of the space; and a facility controller that controls the facility to operate or not to operate via the relay, based on the facility information and the use information.

8 Claims, 14 Drawing Sheets

(51) Int. Cl.
 *H04L 12/66* (2006.01)
 *H04Q 9/00* (2006.01)
 *H04H 60/50* (2008.01)

(52) U.S. Cl.
 CPC ..... *H04Q 9/00* (2013.01); *G05B 2219/23051* (2013.01); *H04Q 2209/10* (2013.01)

(58) Field of Classification Search
 CPC ...... H04L 12/66; H04Q 9/00; H04Q 2209/10; G08C 17/00
 See application file for complete search history.

(56) References Cited

U.S. PATENT DOCUMENTS

| | | | | |
|---|---|---|---|---|
| 2015/0261484 | A1* | 9/2015 | Wang | G06F 3/1229 |
| | | | | 358/1.15 |
| 2015/0305073 | A1* | 10/2015 | Harr | H04B 7/14 |
| | | | | 307/66 |
| 2017/0093910 | A1* | 3/2017 | Gukal | H04L 63/1416 |
| 2017/0223046 | A1* | 8/2017 | Singh | H04L 63/1491 |
| 2017/0289191 | A1* | 10/2017 | Thioux | H04L 63/1441 |

FOREIGN PATENT DOCUMENTS

| | | | |
|---|---|---|---|
| JP | 2009-070085 A | 4/2009 | |
| JP | 2012-156576 A | 8/2012 | |
| JP | 2014-236282 A | 12/2014 | |

* cited by examiner

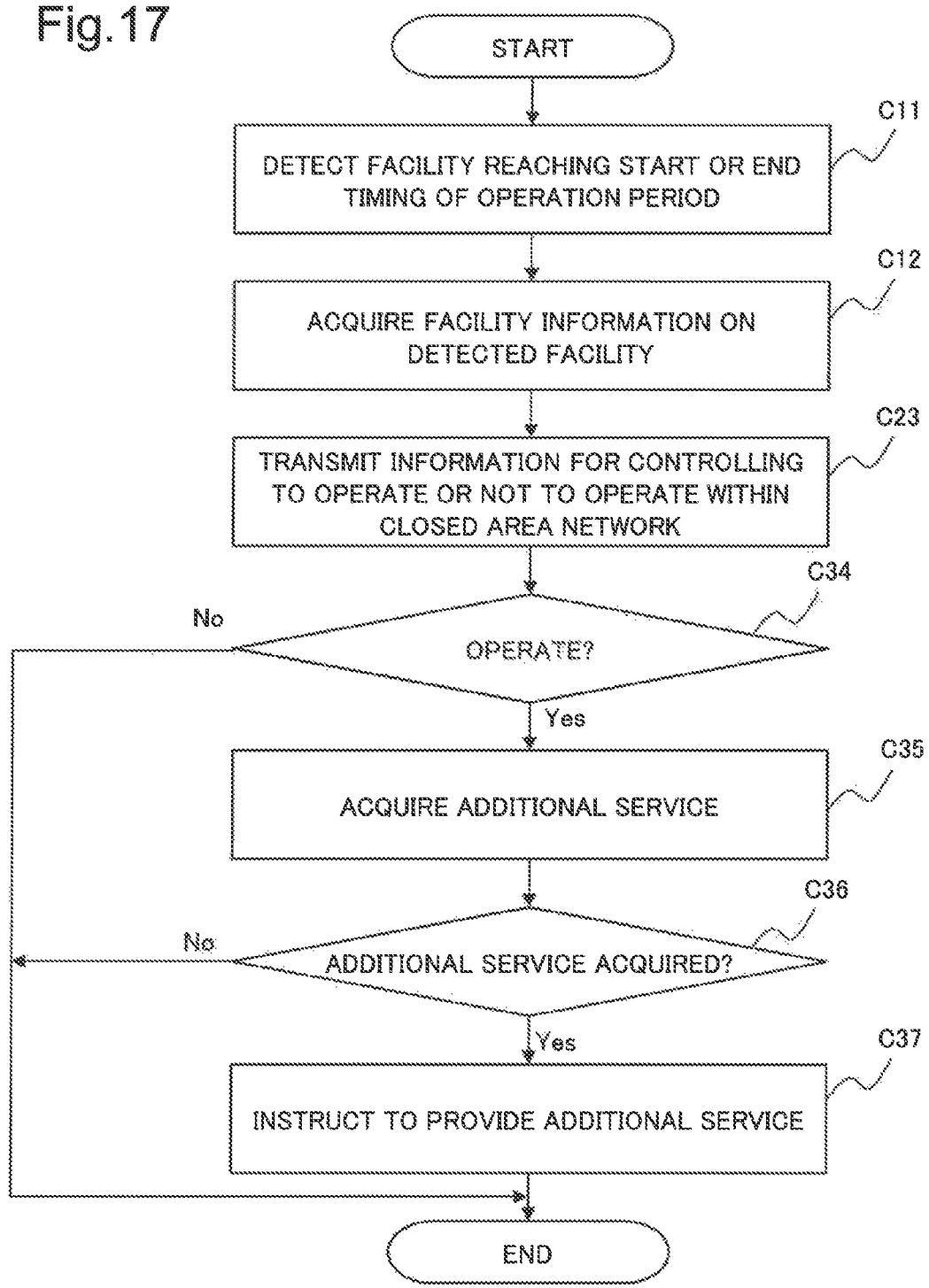

REMOTE MANAGEMENT SYSTEM, CONTROL DEVICE, SERVER, METHOD, AND RECORDING MEDIUM

CROSS REFERENCE TO RELATED APPLICATIONS

This application is a National Stage of International Application No. PCT/JP2017/044648 filed Dec. 13, 2017, claiming priority based on Japanese Patent Application No. 2016-247460 filed Dec. 21, 2016, the disclosures of which are incorporated herein in their entirety.

TECHNICAL FIELD

One aspect of the present invention relates to a technique of remotely controlling a facility within a space.

BACKGROUND ART

In a space to be used by a temporary user, there is an issue relating to use of a facility within the space. For example, there is known a sharing service of mediating a lease or rental of a space such as a rental room, a share house, or a private room which is vacant by traveling or the like. In such a sharing service, regarding a space as a target for a lease or rental, fee setting is performed, taking into consideration a facility usable within the space, as well as a location and an area.

Herein, in such a space, a necessary facility differs among users. In view of the above, for example, fee setting such that an additional fee is collected depending on use of a facility, while basic use fee of a space is suppressed, is effective. However, when a necessary facility is provided for each use, there is an issue that manpower, time, and a place for separately storing a facility are necessary, such as delivering a facility from a related agent, or transporting a facility from a shared space, each time the facility is used.

In view of the above, there is a demand for remotely operating a facility in such a way that a necessary facility for a user is made usable, and an unnecessary facility is made unusable from among facilities installed within the space, each time the space is used.

For example, PTL 1 describes a related technique in which an operation of a facility is remotely performed. In the related technique, the facility includes a machine control unit, and is coupled to an external management system. The management system transmits instruction information to the facility, and the machine control unit of the facility controls an operation of the facility, based on the instruction information. As the facility, for example, a bathroom heating, ventilating, and drying apparatus is exemplified. In this case, the machine control unit controls an operation of each section such as a ventilation fan, a circulation fan, a heater, and a sensor, based on the instruction information.

Further, for example, PTL 2 describes a technique of controlling an in-house facility via a home gateway. The home gateway stores information relating to the in-house facility in response to a request of registration of the information. Further, the home gateway stores configuration information for relaying communication between the facility and an external terminal, and relays the communication. The in-house facility is controlled by the external terminal via the home gateway.

CITATION LIST

Patent Literature

[PTL 1] Japanese Unexamined Patent Application Publication No. 2014-236282
[PTL 2] Japanese Unexamined Patent Application Publication No. 2006-121533

SUMMARY OF INVENTION

Technical Problem

Herein, in the related techniques described in PTLs 1 and 2, it is assumed that a facility is remotely operated by an owner of the facility. Therefore, when this technique is applied to use of controlling whether use of the facility within the space is allowed, each time the space is temporarily used, it is necessary for an administrator to remotely operate the facility at a start or end timing of a use period. This is cumbersome or difficult for an administrator.

One aspect of the present invention has been made in order to solve the above-described issue. Specifically, an object of one aspect of the present invention is to provide a technique of more easily controlling whether use of a facility within a space is allowed, each time the space is temporarily used.

Solution to Problem

A remote management system according to one aspect of the present invention includes:
facility information acquisition means for acquiring facility information representing a facility within a space;
facility information storage means for storing the facility information;
use information acquisition means for acquiring use information representing a facility to be operated during a use period of the space among facilities represented by the facility information;
use information storage means for storing the use information;
relay means for relaying communication between the facility within the space and an external device outside the space; and
facility control means for controlling the facility to operate or not to operate via the relay means, based on the facility information and the use information.

A control device includes the facility control means in the remote management system.

A server includes the facility information acquisition means in the remote management system.

A server includes the use information acquisition means in the remote management system.

A method according to one aspect of the present invention comprising, by a computer device:
acquiring and storing facility information representing a facility within a space;
acquiring and storing use information representing a facility to be operated during a use period of the space among facilities represented by the facility information; and
controlling the facility to operate or not to operate, based on the facility information and the use information, via relay means for relaying communication between the facility within the space and an external device outside the space.

A recording medium recording a program causing a computer device to execute a step of controlling, based on facility information representing a facility within a space, and use information representing a facility to be operated during a use period of the space among facilities represented by the facility information, the facility to operate or not to operate, via relay means for relaying communication between the facility within the space and an external device outside the space.

Advantageous Effects of Invention

One aspect of the present invention is able to provide a technique of more easily controlling whether use of a facility within a space is allowed, each time the space is temporarily used.

BRIEF DESCRIPTION OF DRAWINGS

FIG. 17 is a flowchart describing an operation of controlling a facility by the remote management system as the third example embodiment of the present invention.

EXAMPLE EMBODIMENT

In the following, example embodiments of the present invention are described in detail with reference to the drawings.

First Example Embodiment

Figure 1:
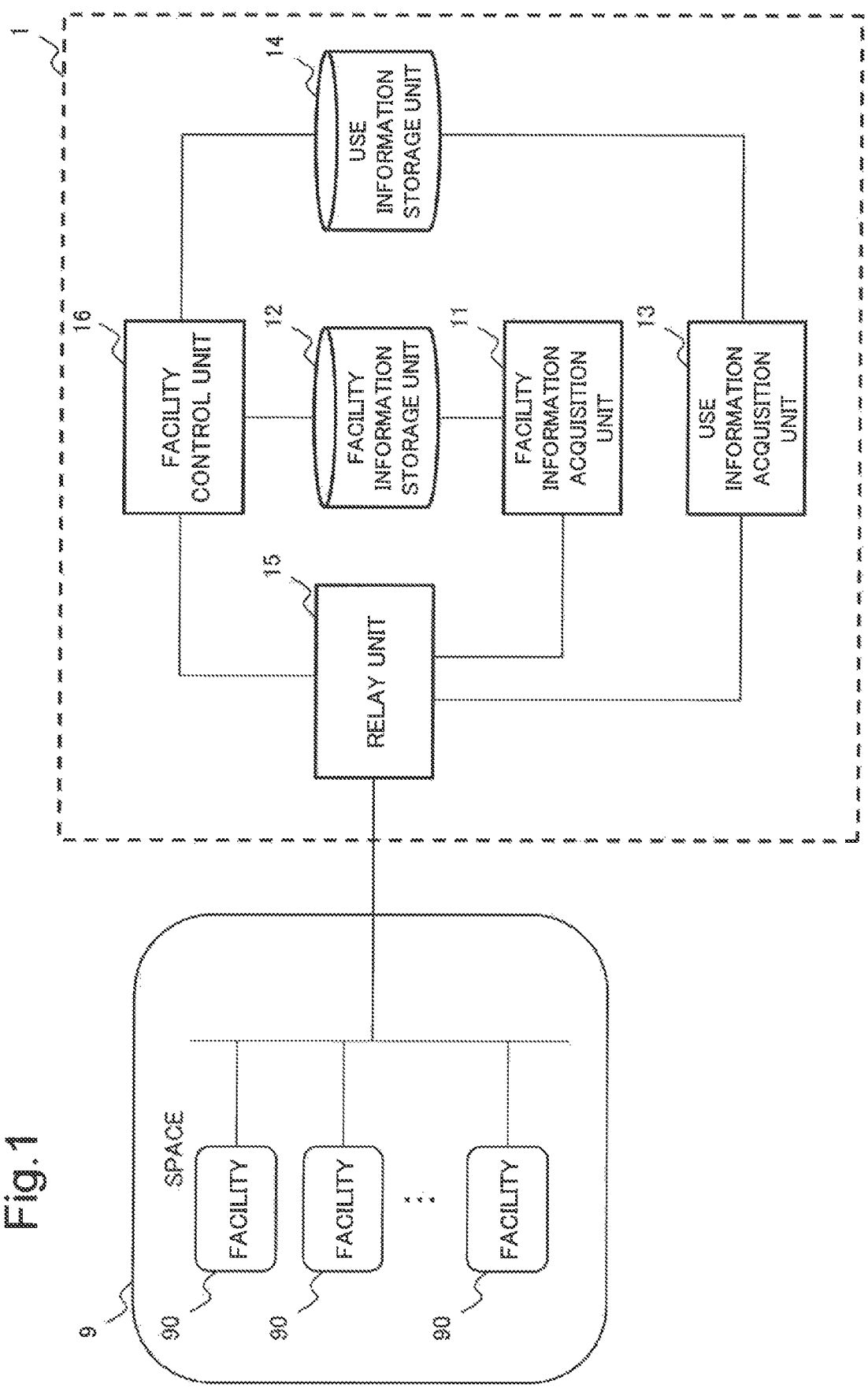
FIG. 1 is a diagram illustrating a functional block configuration of a remote management system as a first example embodiment of the present invention.

FIG. 1 illustrates a functional block configuration of a remote management system 1 as a first example embodiment of the present invention. In FIG. 1, the remote management system 1 includes a facility information acquisition unit 11, a facility information storage unit 12, a use information acquisition unit 13, a use information storage unit 14, a relay unit 15, and a facility control unit 16.

Herein, the remote management system 1 is a system for remote managing a facility 90 within a space 9 of a target.

The space 9 of a target is temporarily used by various users for each use period. For example, the space 9 may be a rental room, a share house, a patient's room in a hospital, a guest room in a hotel, a rental office, an event space, and the like.

One or more facilities 90 are installed within the space 9. Further, it is assumed that a network is installed within the space 9, and each facility 90 is coupled to the network. The remote management system 1 is coupled to a network within the space 9 of the target via the relay unit 15.

A facility 90 is usable by a user of the space 9 during a use period. Further, it is assumed that a facility 90 is connectable to a network, and is at least controllable to remotely operate or not to remotely operate via the network. Herein, it is assumed that a state that a facility 90 is operated is a state that a main power source is supplied to the facility 90, and is a state that a power source is able to be turned on even when the power source is not turned on. Further, it is assumed that a state that a facility 90 is not operated is a state that a main power source of the facility 90 is not supplied, and a power source is unable to be turned on. Note that a facility 90 is desirably configured in such a way that the facility 90 is not directly controllable to operate or not to operate within the space 9 at least during a use period thereof.

Note that while FIG. 1 illustrates three facilities 90, a number of facilities 90 within the space 9 is not limited. Further, when a plurality of facilities 90 are installed within the space 9, not all the facilities 90 have to be of a same type. Further, not all the facilities 90 have to be of types different from one another. For example, at least one of the facilities 90 may be a communication terminal such as a personal computer or a tablet. Further, at least one of facilities 90 may be a household electric appliance such as a television, a recorder, an air conditioner, a microwave oven, a washing machine, or a refrigerator, for example. However, types of facilities 90 are not limited to these examples.

Figure 2:
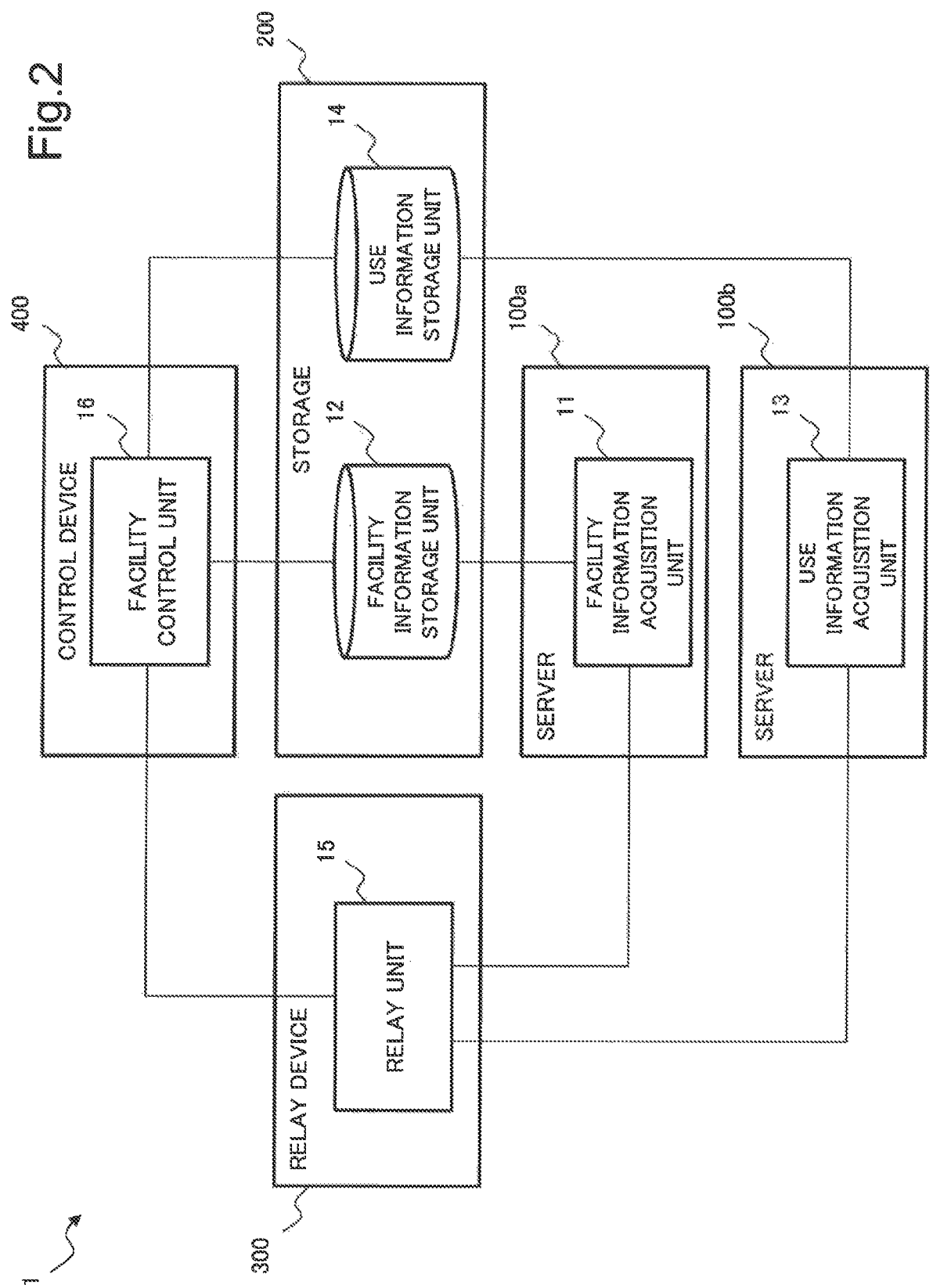
FIG. 2 is a diagram illustrating an example of a configuration in which functional blocks of the remote management system as the first example embodiment of the present invention are distributed among a plurality of devices.

Herein, the remote management system 1 may be configured in such a way that functional blocks are distributed among a plurality of devices, as illustrated in FIG. 2, for example. Specifically, the facility information acquisition unit 11 is disposed on a server 100*a*. Further, the use information acquisition unit 13 is disposed on a server 100*b*.

Note that the servers 100a and 100b may be implemented by a same device. Further, the facility information storage unit 12 and the use information storage unit 14 are disposed on a storage 200. Furthermore, the relay unit 15 is disposed on a relay device 300. Moreover, the facility control unit 16 is disposed on a control device 400. In this case, the relay device 300 is communicably coupled to each of the servers 100a and 100b, and the control device 400. Further, each of the servers 100a and 100b, and the control device 400 is communicably coupled to the storage 200.

Figure 3:
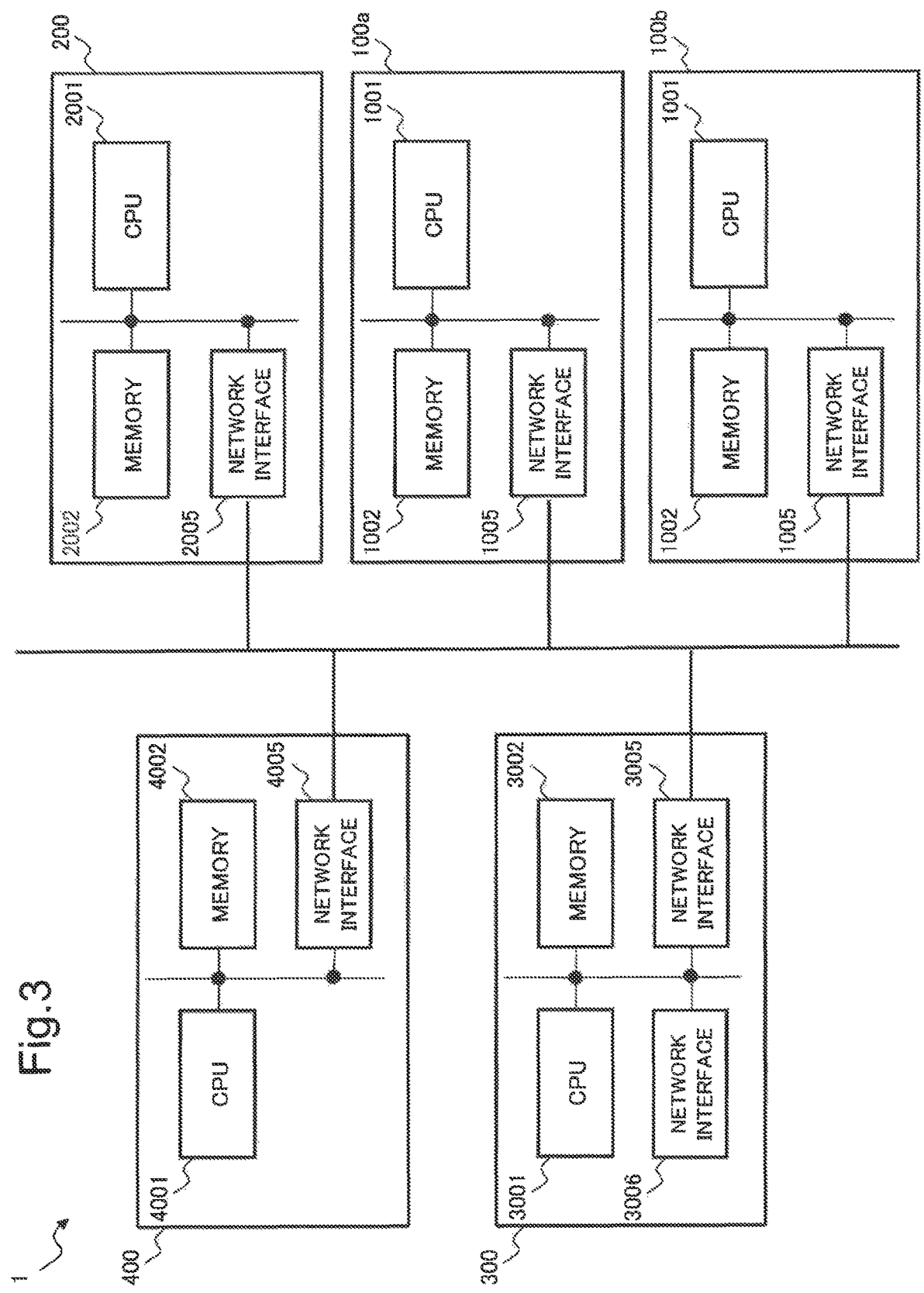
FIG. 3 is a diagram illustrating an example of a hardware configuration of the remote management system as the first example embodiment of the present invention.

In this case, each device constituting the remote management system 1 is configurable by hardware elements illustrated in FIG. 3.

In FIG. 3, each of the servers 100a and 100b includes a Central Processing Unit (CPU) 1001, a memory 1002, and a network interface 1005. The memory 1002 is constituted by a Random Access Memory (RAM), a Read Only Memory (ROM), an auxiliary storage device (such as a hard disk), and the like. The network interface 1005 is an interface which connects to a network for performing communication between the storage 200 and the relay device 300. In this case, the facility information acquisition unit 11 on the server 100a is constituted by the network interface 1005, and the CPU 1001 for reading and executing a computer program stored in the memory 1002. Further, the use information acquisition unit 13 on the server 100b is constituted by the network interface 1005, and the CPU 1001 for reading and executing a computer program stored in the memory 1002.

The storage 200 includes a CPU 2001, a memory 2002, and a network interface 2005. The memory 2002 is constituted by a RAM, a ROM, an auxiliary storage device, and the like. The network interface 2005 is an interface which connects to a network for performing communication among the servers 100a and 100b, and the control device 400. In this case, the facility information storage unit 12 and the use information storage unit 14 are constituted by the memory 2002.

The relay device 300 includes a CPU 3001, a memory 3002, a network interface 3005, and a network interface 3006. The memory 3002 is constituted by a RAM, a ROM, an auxiliary storage device, and the like. The network interface 3005 is an interface which connects to a network for performing communication among the servers 100a and 100b, and the control device 400. The network interface 3006 is an interface for performing communication with a facility 90 within the space 9. In this case, the relay unit 15 is constituted by the network interfaces 3005 and 3006, and the CPU 3001 for reading and executing a computer program stored in the memory 3002.

The control device 400 includes a CPU 4001, a memory 4002, and a network interface 4005. The memory 4002 is constituted by a RAM, a ROM, an auxiliary storage device, and the like. The network interface 4005 is an interface which connects to a network for performing communication between the storage 200 and the relay device 300. In this case, the facility control unit 16 is constituted by the network interface 4005, and the CPU 4001 for reading and executing a computer program stored in the memory 4002.

Note that a hardware configuration of the remote management system 1 and each functional block thereof is not limited to the above-described configuration.

Next, details on each functional block are described.

The facility information acquisition unit 11 acquires facility information, and stores the facility information in the facility information storage unit 12. Facility information is information representing a facility 90 within the space 9. For example, facility information may include identification information of the space 9 where a facility 90 is installed. Further, for example, facility information may include identification information of a facility 90, which is needed in accessing to the facility 90 via a network. Further, for example, facility information may include, in addition to identification information of the space 9 and identification information of a facility 90, a use fee of the facility 90 per hour.

For example, the facility information acquisition unit 11 may provide a user interface for registering a facility 90 within the space 9. In this case, the user interface provided by the facility information acquisition unit 11 is typically used by an owner of the space 9.

Specifically, the facility information acquisition unit 11 may transmit, to a communication terminal being one of facilities 90 within the space 9, a user interface screen for registering the facility 90 within the space 9, and cause the user interface screen to be displayed. Then, in this case, the facility information acquisition unit 11 may receive, as facility information, information input on the communication terminal. Further, the facility information acquisition unit 11 may store the received facility information in the facility information storage unit 12. Note that the facility information acquisition unit 11 may be further able to change or delete facility information on such a user interface.

The use information acquisition unit 13 acquires use information, and stores the use information in the use information storage unit 14. Use information is information representing a facility 90 to be operated during a use period of the space 9 associated among facilities 90 represented by facility information stored in the facility information storage unit 12. For example, use information includes information representing an operation period during which the facility 90 is operated. An operation period may be identical to a use period of the space 9, or may be a part of a use period.

For example, the use information acquisition unit 13 may provide a user interface for submitting an application for use of a facility 90 which a user wishes to use during a use period of the space 9. In this case, the user interface provided by the use information acquisition unit 13 is typically used by a user of the space 9.

Specifically, the use information acquisition unit 13 may transmit, to the communication terminal being one of facilities 90 within the space 9, a user interface screen on which a user selects and submits an application for use of a facility 90 which the user wishes to use from a list of facilities 90 within the space 9, and cause the user interface screen to be displayed. A list of facilities 90 within the space 9 is acquirable by referring to facility information stored in the facility information storage unit 12. Then, in this case, the use information acquisition unit 13 may receive information input on the communication terminal, as use information. Then, the use information acquisition unit 13 may store the received use information in the use information storage unit 14. Note that the use information acquisition unit 13 may be further able to change or delete use information on such a user interface.

The relay unit 15 relays communication between a facility 90 within the space 9 and an outside of the space 9.

The facility control unit 16 controls a facility 90 to operate or not to operate via the relay unit 15, based on facility information and use information. Specifically, the facility control unit 16 detects a facility 90 serving as a start timing or an end timing of an operation period, based on use information stored in the use information storage unit 14.

Then, the facility control unit 16 acquires identification information of the detected facility 90, based on facility information stored in the facility information storage unit 12. Then, the facility control unit 16 may transmit information for controlling the associated facility 90 to operate or not to operate via the relay unit 15 by using the acquired identification information.

An operation of the remote management system 1 configured as described above is described with reference to the drawings.

Figure 4:
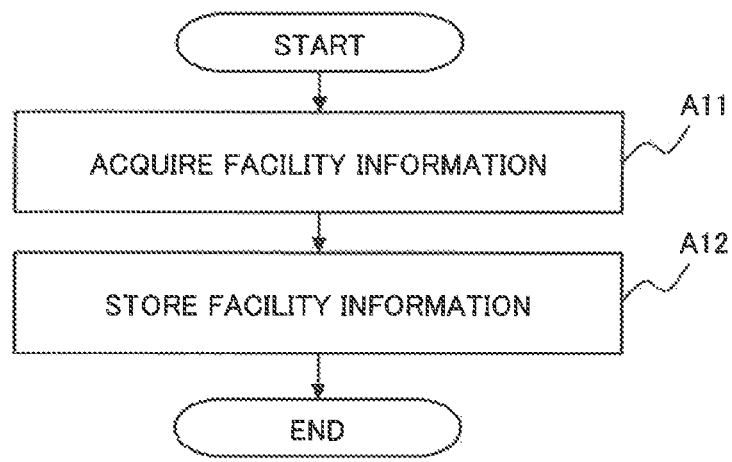
FIG. 4 is a flowchart describing an operation of acquiring facility information by the remote management system as the first example embodiment of the present invention.

FIG. 4 is a flowchart describing an operation of the facility information acquisition unit 11.

First, the facility information acquisition unit 11 acquires facility information (Step A11).

For example, as described above, the facility information acquisition unit 11 may transmit, to a communication terminal being one of facilities 90 within the space 9, a user interface screen for registering a facility 90 within the space 9, and receive information input on the terminal, as facility information.

Next, the facility information acquisition unit 11 stores the acquired facility information in the facility information storage unit 12 (Step A12).

Thus, the facility information acquisition unit 11 finishes the operation.

Figure 5:
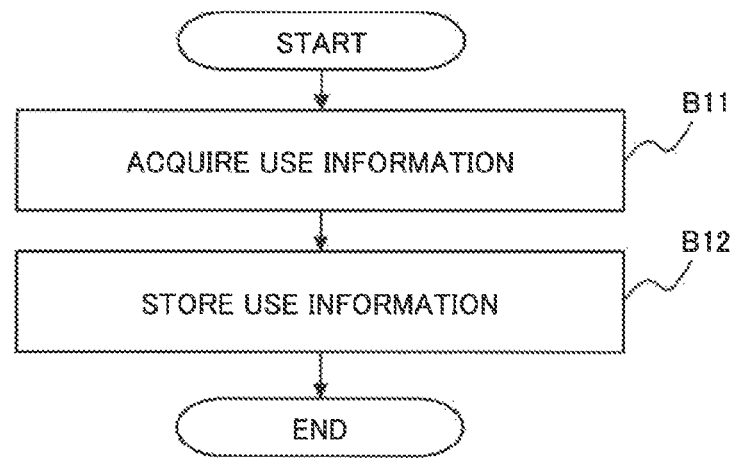
FIG. 5 is a flowchart describing an operation of acquiring use information by the remote management system as the first example embodiment of the present invention.

FIG. 5 is a flowchart describing an operation of the use information acquisition unit 13.

First, the use information acquisition unit 13 acquires use information (Step B11).

For example, as described above, the use information acquisition unit 13 may transmit, to a communication terminal being one of facilities 90 within the space 9, a user interface screen for submitting an application for use of a facility 90 which a user wishes to use from a list of facilities 90, and receive information input on the communication terminal, as use information.

Next, the use information acquisition unit 13 stores the acquired use information in the use information storage unit 14 (Step B12).

Thus, the use information acquisition unit 13 finishes the operation.

Figure 6:
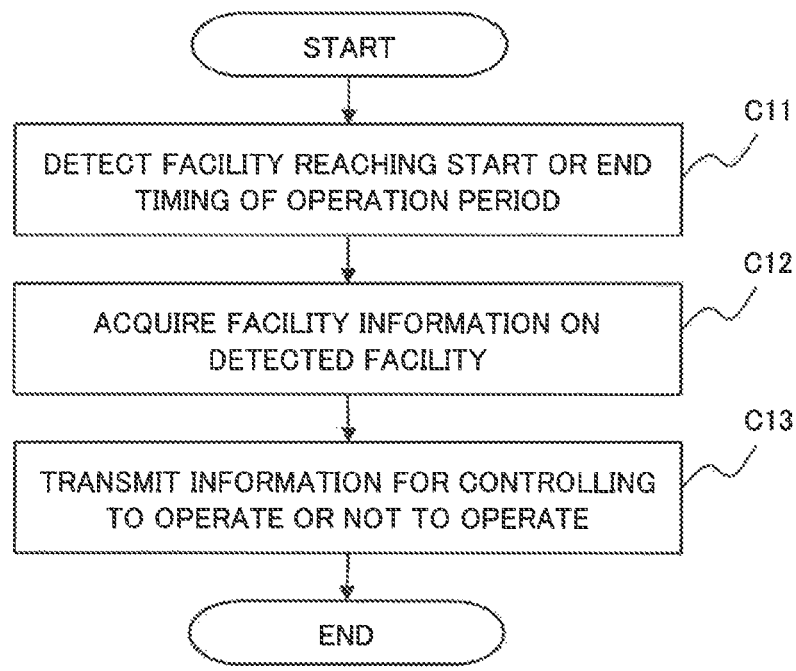
FIG. 6 is a flowchart describing an operation of controlling a facility by the remote management system as the first example embodiment of the present invention.

FIG. 6 is a flowchart describing an operation of the facility control unit 16.

First, the facility control unit 16 detects a facility 90 reaching a start timing or an end timing of an operation period by referring to use information in the use information storage unit 14 (Step C11).

Next, the facility control unit 16 acquires facility information relating to the detected facility 90 from the facility information storage unit 12 (Step C12).

Next, the facility control unit 16 generates information for controlling the facility 90 to operate or not to operate, based on the facility information acquired in Step C12, and transmits the information via the relay unit 15 (Step C13).

Thus, the facility control unit 16 finishes the operation.

Next, advantageous effects of the first example embodiment of the present invention are described.

A remote management system as the first example embodiment of the present invention is able to more easily control whether use of a facility within a space is allowed, each time the space is temporarily used.

A reason for this is described. In the present example embodiment, a facility information acquisition unit acquires facility information representing a facility within a space, and stores the facility information in a facility information storage unit. Further, a use information acquisition unit acquires use information representing a facility to be operated during a use period of the space among facilities represented by the facility information, and stores the use information in a use information storage unit. Furthermore, a facility control unit controls the facility to operate or not to operate via a relay unit for relaying communication between the facility within the space and the external device outside the space, based on the facility information and the use information.

In this way, by employing the present example embodiment, the owner of the space is allowed to register the facility within the space, and the user of the space is allowed to submit an application for use of the facility which the user wishes to use during a use period of the space. Further, the present example embodiment is able to operate the facility, of which an application for use is submitted, during the use period of the space. Thus, the present example embodiment is able to operate the facility, which is needed for each use, without the need of a cumbersome operation, each time the space is temporarily used. Consequently, the present example embodiment is also advantageous in an operation of adding a fee depending on an operated facility, while suppressing basic fee of the space.

Figure 7:
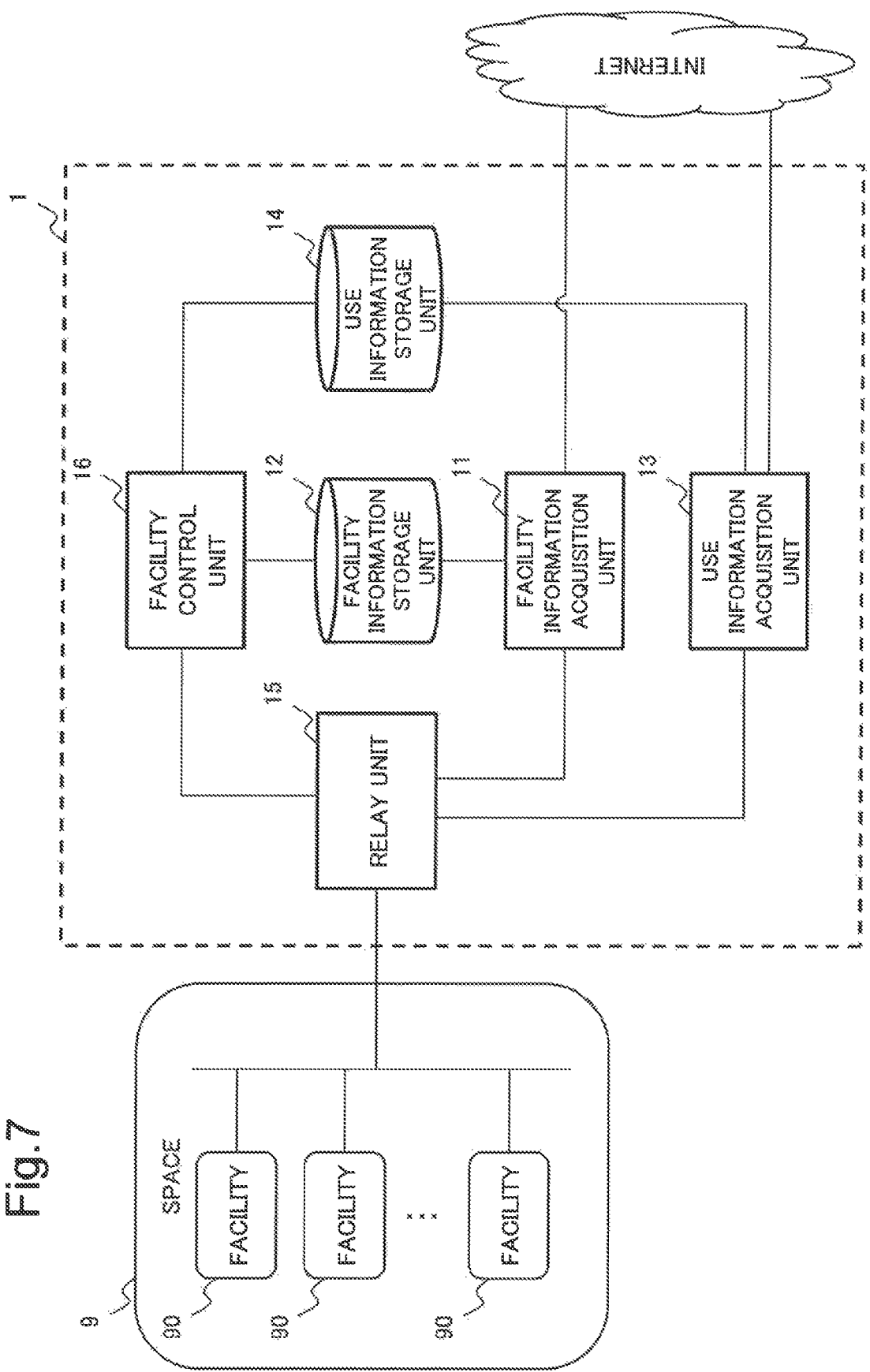
FIG. 7 is a diagram illustrating another network configuration example of the remote management system as the first example embodiment of the present invention.

Note that, in the present example embodiment, as illustrated in FIG. 7, the facility information acquisition unit 11 and the use information acquisition unit 13 may be coupled to an external network such as the Internet. By configuring as described above, the facility information acquisition unit 11 is able to acquire facility information via an external network, and the use information acquisition unit 13 is able to acquire use information via an external network.

Specifically, in FIG. 7, the facility information acquisition unit 11 is able to provide, for the owner of the space 9, a communication terminal on an outside of the space 9 with a user interface for registering facility information. Such a user interface may be provided as a website, which is generally called a web portal. Thus, the owner of the space 9 is able to register, from an outside of the space 9, a facility 90 which the owner wishes to control to operate or not to operate for each use within the space 9. Note that, in this case, the facility information acquisition unit 11 may desirably apply a well-known authentication technique in such a way that an access via an external network is permitted to the owner of the space 9. Further, in this case, the facility information acquisition unit 11 may also apply a well-known authentication technique to an access from within the space 9.

Further, in FIG. 7, the use information acquisition unit 13 is able to provide in advance, for a user of the space 9, a communication terminal on an outside of the space 9 with a user interface for registering use information. Such a user interface may be provided as a website, which is generally called a web portal, for example. Thus, a user who reserved use of the space 9 is able to submit in advance an application for use of a facility 90 which the user wishes to operate during a use period, from an outside of the space 9. Note that, in this case, the use information acquisition unit 13 may desirably apply a well-known authentication technique in such a way that an access via an external network is permitted to a user who reserved use of the space 9. Further, in this case, the use information acquisition unit 13 may also apply a well-known authentication technique to an access from within the space 9. Alternatively, the use information acquisition unit 13 may permit an access from within the space 9 during a reserved use period, by assuming that the access is performed by the user who reserved use.

Second Example Embodiment

Next, a second example embodiment according to the present invention is described in detail with reference to the drawings. Note that in each drawing to be referred to in describing the present example embodiment, same configurations and similarly operating steps as those in the first example embodiment of the present invention are indicated with same reference numbers, and detailed description thereof in the present example embodiment is omitted.

Figure 8:
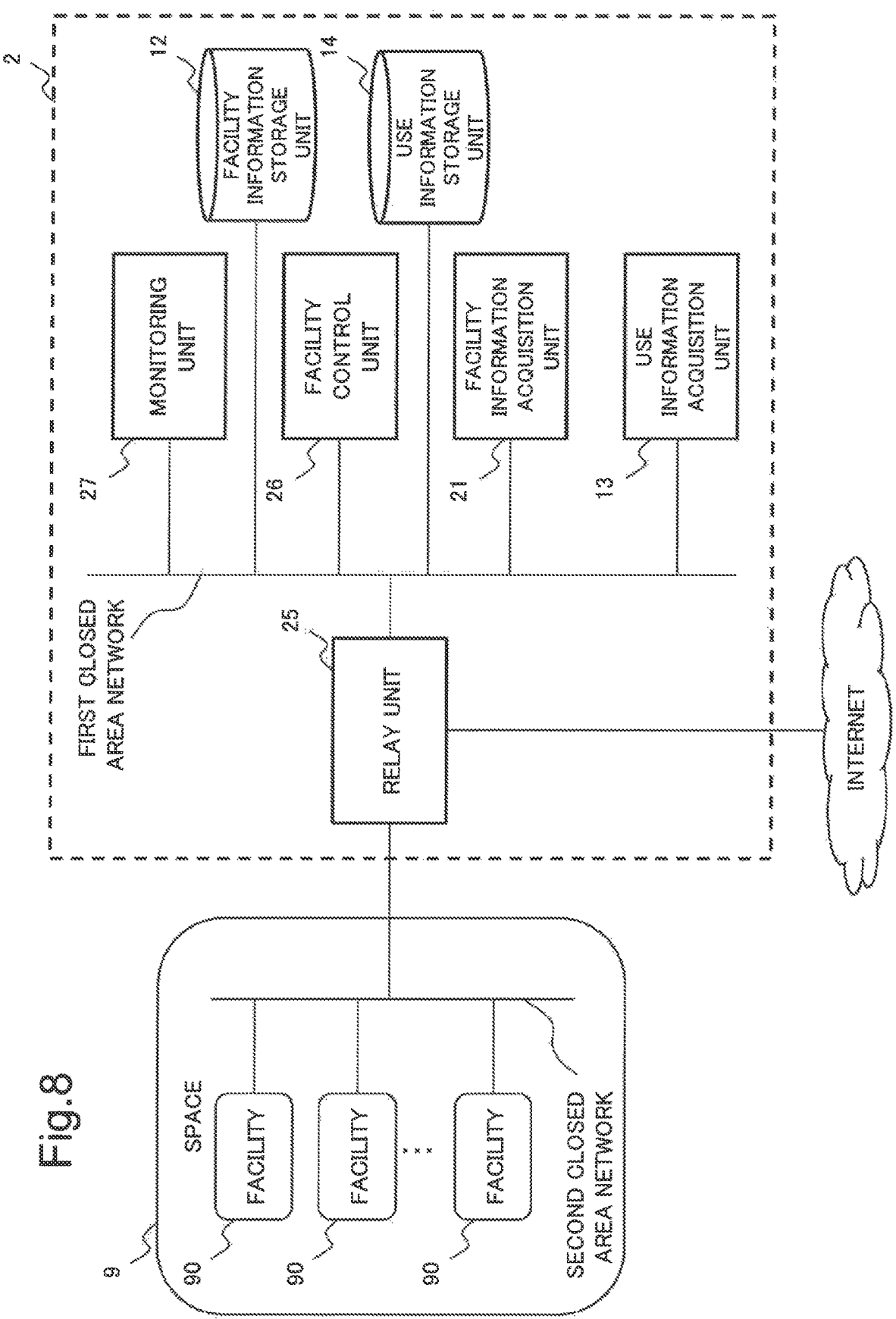
FIG. 8 is a diagram illustrating a functional block configuration of a remote management system as a second example embodiment of the present invention.

FIG. 8 illustrates a configuration of a remote management system 2 as the present example embodiment. In FIG. 8, the remote management system 2 is different from the remote management system 1 as the first example embodiment of the present invention in the following point. Specifically, the remote management system 2 includes a facility information acquisition unit 21 in place of the facility information acquisition unit 11, a relay unit 25 in place of the relay unit 15, and a facility control unit 26 in place of the facility control unit 16. Further, the remote management system 2 further includes a monitoring unit 27.

Herein, the remote management system 2 is configurable by the servers 100a and 100b, the storage 200, the relay device 300, and the control device 400, which are described with reference to FIG. 3. Further, each functional block of the remote management system 2 is configurable by each hardware element of each device, which is described with reference to FIG. 3. Furthermore, in this case, the monitoring unit 27 may be disposed on the relay device 300. In this case, the monitoring unit 27 is constituted by the network interface 3006, and the CPU 3001 for reading and executing a computer program stored in the memory 3002. Alternatively, the monitoring unit 27 may be disposed on the control device 400. In this case, the monitoring unit 27 is constituted by the network interface 4005, and the CPU 4001 for reading and executing a computer program stored in the memory 4002.

Note that a hardware configuration of the remote management system 2 and each functional block is not limited to the above-described configuration.

Herein, an example of a network configuration of the remote management system 2 is described. As illustrate in FIG. 8, the facility information acquisition unit 21, the facility information storage unit 12, the use information acquisition unit 13, the use information storage unit 14, the relay unit 25, the facility control unit 26, and the monitoring unit 27 are coupled to a first closed area network.

Further, in the present example embodiment, it is assumed that a network to which a facility 90 is coupled within the space 9 is referred to as a second closed area network.

The facility information acquisition unit 21 acquires facility information, and store the facility information in the facility information storage unit 12. In the present example embodiment, facility information further includes information indicating whether a facility 90 is a monitor target. It is assumed that a monitor target is a target to be monitored whether a location of the facility 90 is normal. Specifically, facility information includes information indicating whether a facility is a monitor target, in addition to identification information of the space 9, identification information of a facility 90, a use fee, and the like as described in the first example embodiment of the present invention. Note that, in the present example embodiment, a media access control (MAC) address is assumed as identification information of a facility 90.

For example, the facility information acquisition unit 21 may provide a user interface for registering whether a facility 90 is a monitor target in combination in registering the facility 90.

The relay unit 25 relays communication between the facility control unit 26 and a facility 90 via a virtual circuit for virtually and directly coupling a first closed area network and a second closed area network. Specifically, the relay unit 25 connects a first closed area network and a second closed area network by a Layer 2 connection. Layer 2 is called a "data link layer" in an Open Systems Interconnection (OSI) reference model, for example. Layer 2 is a layer that defines a signal protocol within an independent network in which data communication is enabled without relaying (routing) another equipment. By a Layer 2 connection, a first closed area network and a second closed area network constitute a same closed area network. As such a Layer 2 connection, a well-known technique such as Q-in-Q, Ethernet (registered trademark), Over Generic Routing Encapsulation (GRE), Layer 2 Tunneling Protocol (L2TP), or Virtual eXtensible Local Area Network (VxLAN) may be applied. However, a method for implementing a virtual circuit is not limited to these methods.

Further, the relay unit 25 may have a Dynamic Host Configuration Protocol (DHCP) function of allocating a local address to each facility 90 within a second closed area network.

Furthermore, the relay unit 25 may further relay communication between each facility 90 within a second closed area network, and an external network such as the Internet. In this case, the relay unit 25 may have a Network Address Translation (NAT) function of translating between a local address appended to each facility 90, and a global address for performing communication with an outside. Thus, a facility 90 within the space 9 is able to perform communication with an outside such as the Internet.

The facility control unit 26 controls a facility 90 to operate or not to operate via the relay unit 25, based on facility information and use information. Herein, as described above, first and second closed area networks are directly coupled to each other by a virtual circuit by way of the relay unit 25, and constitute a same closed area network. In other words, in the present example embodiment, the facility control unit 26 controls a facility 90 to operate or not to operate within a same closed area network. At this occasion, as a method for operating a facility 90 within a same closed area network, for example, it is possible to apply a Wake on LAN (registered trademark) by a magic packet. A magic packet is generally transmitted as a broadcast, and enables a remote operation within a same closed area network. In the present example embodiment, the facility control unit 26 and a facility 90 are present within a same closed area network. Therefore, it is possible to transmit a magic packet to the facility 90 from the facility control unit 26. Further, there is a case that a remote start software based on a Wake on LAN is provided by a manufacturer or the like of a facility 90. In this case, the facility control unit 26 may employ such a remote start software. However, a method for operating a facility 90 from an outside of the space 9 is not limited to a Wake on LAN.

The monitoring unit 27 performs monitoring for determining whether a location of a facility 90 is normal, based on a communication status with the facility 90 as a monitor target via the relay unit 25. Herein, a facility 90 as a monitor target is detectable by referring to facility information stored in the facility information storage unit 12.

Specifically, the monitoring unit 27 performs predetermined communication with a facility 90 as a monitor target at each predetermined timing. Predetermined communication may be communication for confirming network connection such as ping or keep alive, for example. In this case, the monitoring unit 27 may use a local address appended by the relay unit 25 to a facility 90 as a monitor target when being used, for communication with the facility 90 as a monitor target. Note that, in this case, the monitoring unit 27 is able to monitor an operating facility 90. For example, it is possible to operate in such a way that a use fee of a facility 90 as a monitor target is included in a basic fee of the space 9 by assuming that the facility 90 is not a target for which an application for use is submitted, and the facility 90 is kept on being operated during a use period.

Then, the monitoring unit 27 determines that a location of the facility 90 is not normal, when a communication status is not normal. Note that a state that a communication status is not normal may mean that information, which is supposed to be acquired from the facility 90 by predetermined communication, is not receivable. A state that information is not receivable is, for example, a state that a cable of a facility 90 is disconnected and communication is disabled in a case of wired communication, and is a state that a facility 90 is not present within a predetermined communication area in a case of wireless communication.

Further, when the monitoring unit 27 determines that a location of the facility 90 is not normal, the monitoring unit 27 may perform control of locking an entrance/exit such as a window or a door of the space 9. In this case, there is a premise that a locking mechanism of an entrance/exit of the space 9 is coupled to a second closed area network, and is remotely controllable via the network. Thus, the monitoring unit 27 is able to prevent a facility 90 whose location is determined to be not normal from being took out by a user.

An operation of the remote management system 2 configured as described above is described with reference to the drawings.

Note that, since an operation of the use information acquisition unit 13 is the same as the operation in the first example embodiment of the present invention described with reference to FIG. 5, description on the operation in the present example embodiment is omitted.

Figure 9:
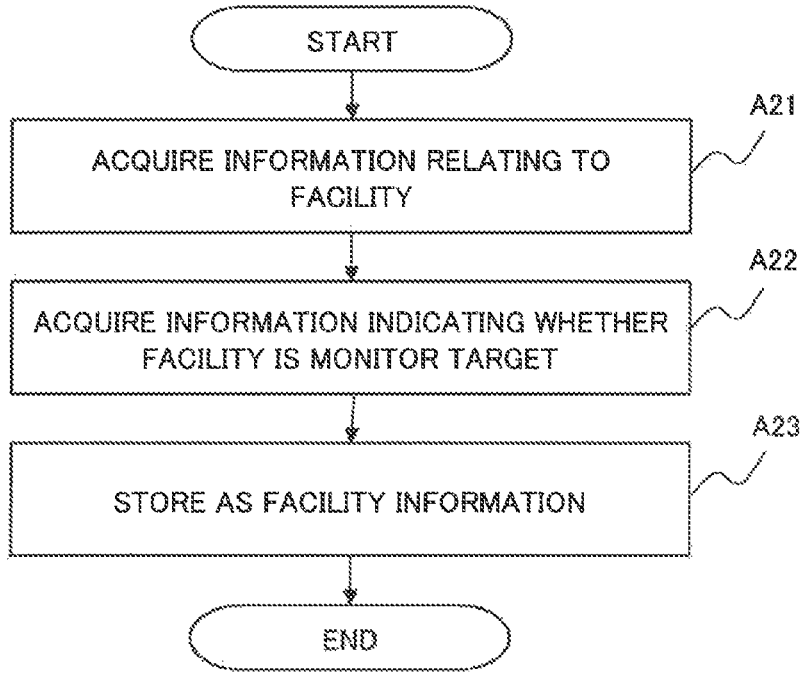
FIG. 9 is a flowchart describing an operation of acquiring facility information by the remote management system as the second example embodiment of the present invention.

FIG. 9 is a flowchart describing an operation of the facility information acquisition unit 21.

First, the facility information acquisition unit 21 acquires information representing a facility 90 within the space 9 (Step A21). Information acquired herein may be identification information of the facility 90, or a use fee per hour as described above, for example.

Next, the facility information acquisition unit 21 acquires information indicating whether the facility 90 represented by the information acquired in Step A21 is a monitor target (Step A22).

For example, as described above, the facility information acquisition unit 21 may register a facility 90, and at the same time, provide a user interface for registering information indicating whether the facility 90 is a monitor target. Further, the user interface may be used via the relay unit 25 from a communication terminal being one of facilities 90 within the space 9.

Next, the facility information acquisition unit 21 stores, in the facility information storage unit 12, the information acquired in Steps A21 and A22 as facility information (Step A23).

Thus, the facility information acquisition unit 21 finishes the operation.

Figure 10:
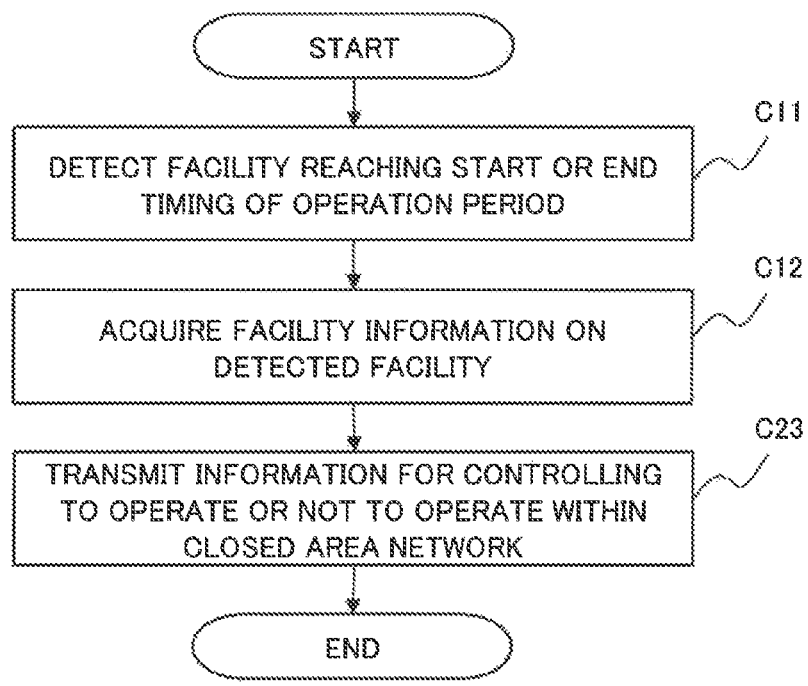
FIG. 10 is a flowchart describing an operation of controlling a facility by the remote management system as the second example embodiment of the present invention.

FIG. 10 is a flowchart describing an operation of controlling a facility 90 by the facility control unit 26.

First, the facility control unit 26 performs Steps C11 to C12 similarly to the first example embodiment of the present invention. Thus, facility information of a facility 90 reaching a start or end timing of an operation period is acquired.

Next, the facility control unit 26 generates information for controlling the facility 90 to operate or not to operate, based on facility information, and transmits the information within a same closed area network (Step C23).

Thus, the facility control unit 26 finishes the operation.

Figure 11:
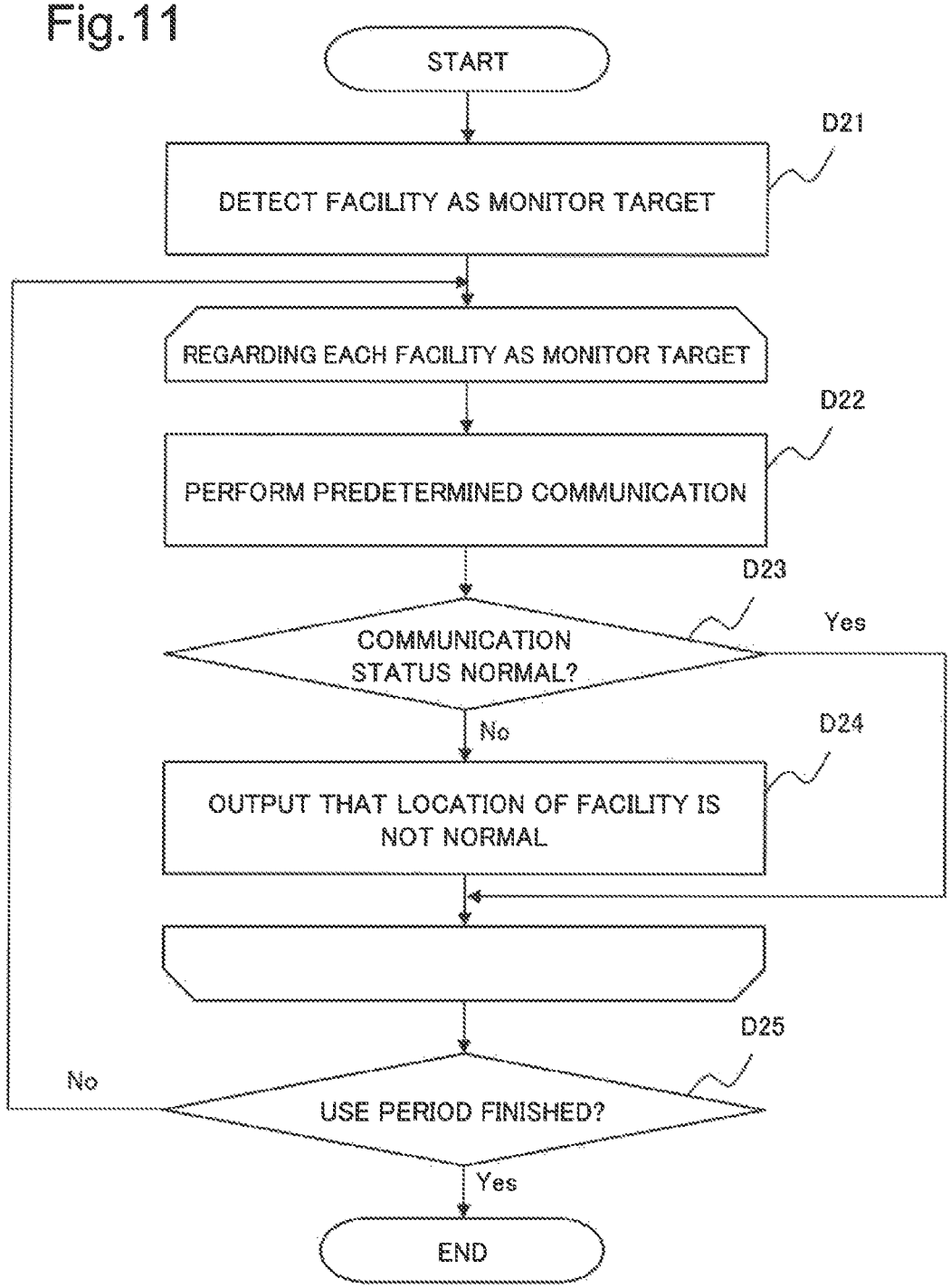
FIG. 11 is a flowchart describing an operation of monitoring a location of a facility by the remote management system as the second example embodiment of the present invention.

FIG. 11 is a flowchart describing an operation of monitoring a facility 90 by the monitoring unit 27. The following operation is performed in response to a use start of the space 9.

First, the monitoring unit 27 detects a facility as a monitor target from facilities 90 within the space 9 by referring to the facility information storage unit 12 (Step D21).

Note that, as described above, when a network address is needed in predetermined communication for use in monitoring, following this step, the relay unit 25 allocates a local network address to each detected facility 90.

Next, the monitoring unit 27 performs Steps D22 to D24 for each detected facility 90.

Specifically, herein, first, the monitoring unit 27 performs predetermined communication with the facility 90 (Step D22).

Next, the monitoring unit 27 determines whether a communication status of the predetermined communication is normal (Step D23).

Herein, a case that a communication status is not normal is described. In this case, the monitoring unit 27 determines that a location of the facility 90 is not normal, and outputs the determination result (Step D24).

For example, the monitoring unit 27 may output, to a display device coupled to the control device 400, a determination result that a location of the facility 90 is not normal. Further, the monitoring unit 27 may output a warning sound to a speaker coupled to the control device 400, for example. Furthermore, the monitoring unit 27 may output, to a prescribed e-mail address, a determination result that a location of the facility 90 is not normal by e-mail transmission.

Further, as described above, in Step D24, the monitoring unit 27 may perform remote control in such a way as to lock a locking mechanism of an entrance/exit of the space 9.

On the other hand, when a communication status of the predetermined communication is normal (Yes in Step D23), the monitoring unit 27 repeats the operation from Step D22 for another facility 90 with which the predetermined communication is not yet performed.

When Steps D22 to D24 are completed for all facilities 90 as monitor targets detected in Step D21, the monitoring unit 27 determines whether a use period of the space 9 is finished (Step D25).

Herein, when a use period is not finished, after waiting until a predetermined timing, the monitoring unit 27 repeats the operation of Steps D22 to D24 for each facility 90 in which a communication status is normal.

On the other hand, when a use period is finished, the monitoring unit 27 finishes the operation.

Next, advantageous effects of the second example embodiment of the present invention are described.

A remote management system as the second example embodiment of the present invention is able to avoid security-related issues, while more easily controlling whether use of a facility within a space is allowed, each time the space is temporarily used.

A reason for this is described. In the present example embodiment, in addition to a configuration similar to the configuration of the first example embodiment of the present invention, at least a facility control unit and a relay unit are coupled to a first closed area network. Further, the relay unit performs relaying via a virtual circuit for virtually and directly coupling the first closed area network, and a second closed area network to which a facility is coupled within a space. Furthermore, the facility control unit controls the facility to operate or not to operate within a same closed area network configured by virtually and directly coupling the first and second closed area networks.

In this way, the present example embodiment provides a Customer Promise Equipment (CPE) function in a second closed area network within a space by a relay unit within a first closed area network on a service provider side. Further, the present example embodiment registers a facility in the second closed area network within the space, and provides a user interface for submitting an application for use of the facility. Thus, the present example embodiment is able to acquire information relating to a facility within a space in a first closed area network on a service provider side. Therefore, the present example embodiment is able to control a facility to operate or not to operate within a same closed area network, and prevent the facility from being remotely controlled by invasion via an external network such as the Internet.

Further, a furthermore reason is described. In the present example embodiment, a facility information acquisition unit acquires facility information further including information indicating whether a facility is a monitor target, and stores the facility information in a facility information storage unit. Further, a monitoring unit determines whether a location of the facility is normal, based on a communication status with the facility as a monitor target via a relay unit, and outputs the determination result.

In this way, the present example embodiment is able to support preventing a user from taking out a facility from a space.

Furthermore, the present example embodiment is able to provide a technique of remotely controlling a facility within a space, while avoiding these security-related issues, without installing dedicated equipment within the space.

A reason for this is described. As described above, in the present example embodiment, the relay unit coupled to the first closed area network virtually and directly connects the second closed area network within the space and the first closed area network, and relays communication. Herein, the first closed area network is a network on the service provider side. In other words, a relay unit is disposed on a service provider side. Thus, the owner of the space does not have to install dedicated relay equipment within a target space. In this way, the present example embodiment is advantageous in reducing work and cost such as an expense relating to introducing a space as a target for rent.

Herein, in PTL 1 described in the Background Art, dedicated equipment, namely, the machine control unit, is necessary within a house in order to remotely control an in-house bathroom heating, ventilating, and drying apparatus. Further, in PTL 2, the relay unit, namely, the home gateway is necessary within the house in order to remotely control in-house equipment. However, in the present example embodiment, installing the relay unit on the service provider side does not necessitate dedicated relay equipment within the target space, and introduction is easy.

Third Example Embodiment

Next, a third example embodiment of the present invention is described in detail with reference to the drawings. Note that, in each drawing to be referred to in describing the present example embodiment, same configurations and similarly operating steps as those in the second example embodiment of the present invention are indicated with same reference numbers, and detailed description thereof in the present example embodiment is omitted.

Figure 12:
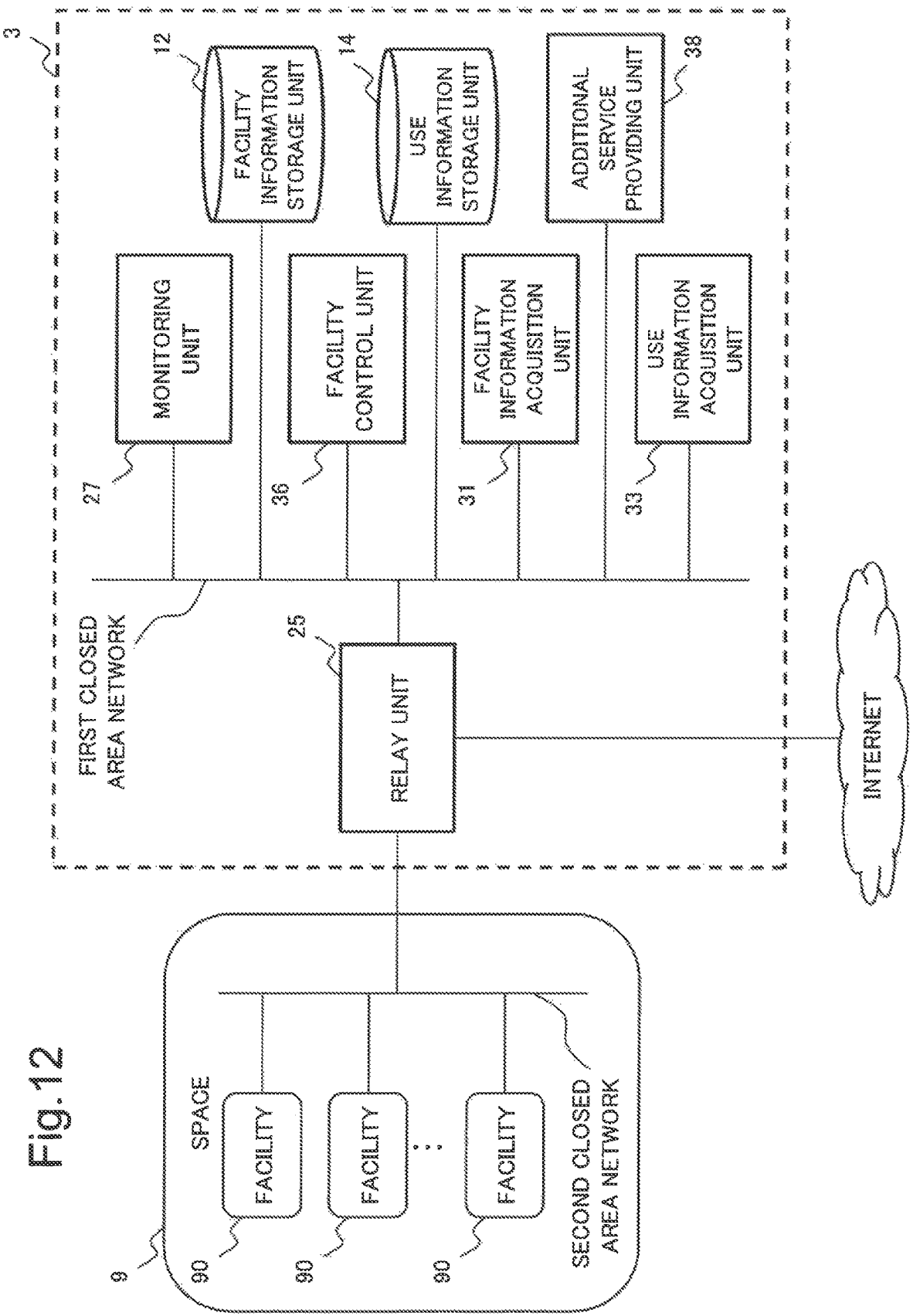
FIG. 12 is a diagram illustrating a functional block configuration of a remote management system as a third example embodiment of the present invention.

FIG. 12 illustrates a configuration of a remote management system 3 as the present example embodiment. In FIG. 12, the remote management system 3 is different from the remote management system 2 as the second example embodiment of the present invention in the following point. Specifically, the remote management system 3 includes a facility information acquisition unit 31 in place of the facility information acquisition unit 21, a use information acquisition unit 33 in place of the use information acquisition unit 13, and a facility control unit 36 in place of the facility control unit 26. Further, the remote management system 3 includes an additional service providing unit 38.

Figure 13:
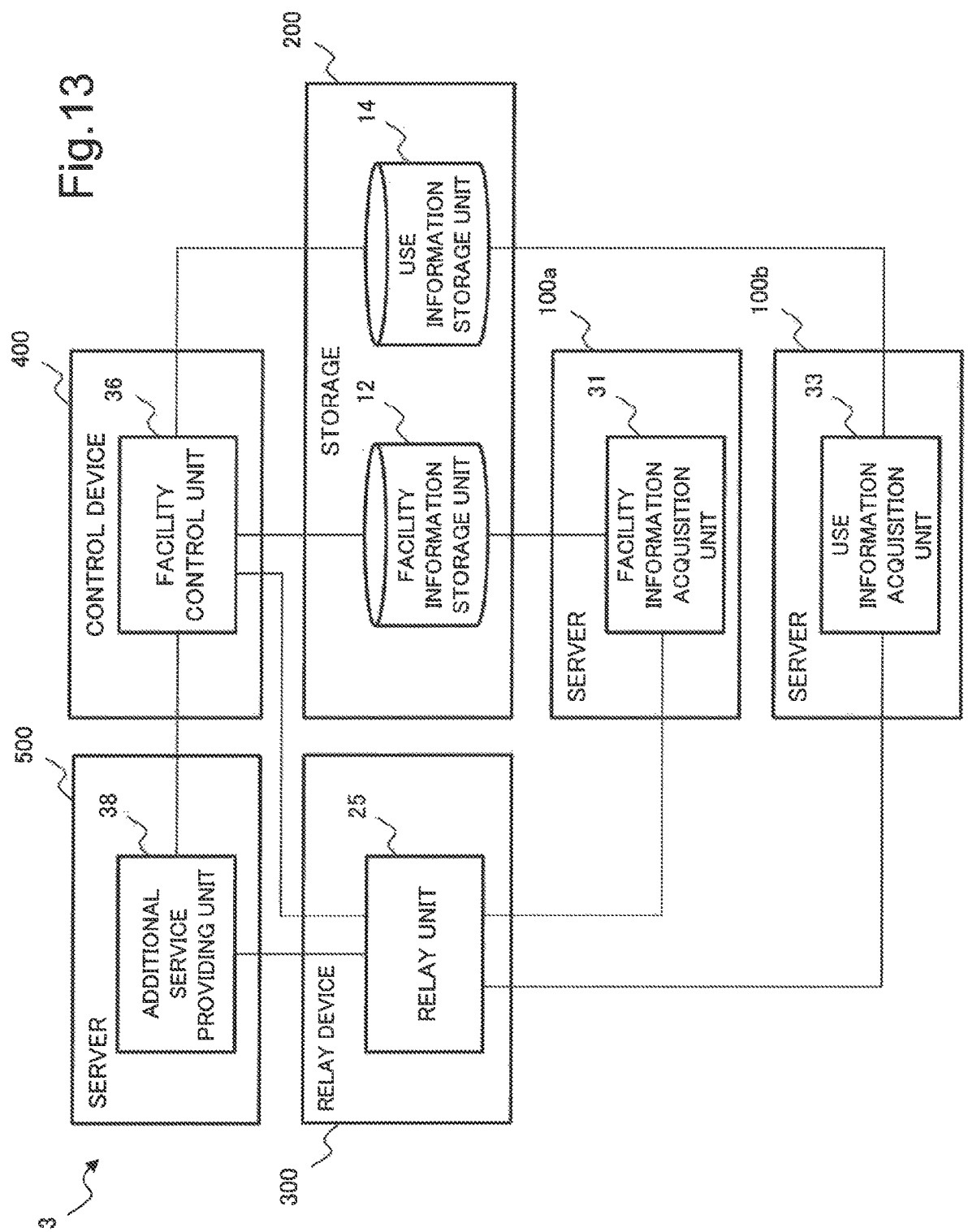
FIG. 13 is a diagram illustrating a configuration example in which functional blocks of the remote management system as the third example embodiment of the present invention are distributed among a plurality of devices.

Herein, the remote management system 3 is configurable by devices illustrated in FIG. 13. Specifically, the remote management system 3 is configurable by a server 500, in addition to the servers 100*a* and 100*b*, the storage 200, the relay device 300, and the control device 400, which are described with reference to FIG. 3. The server 500 is coupled to a first closed area network. Further, the additional service providing unit 38 is disposed on the server 500.

Figure 14:
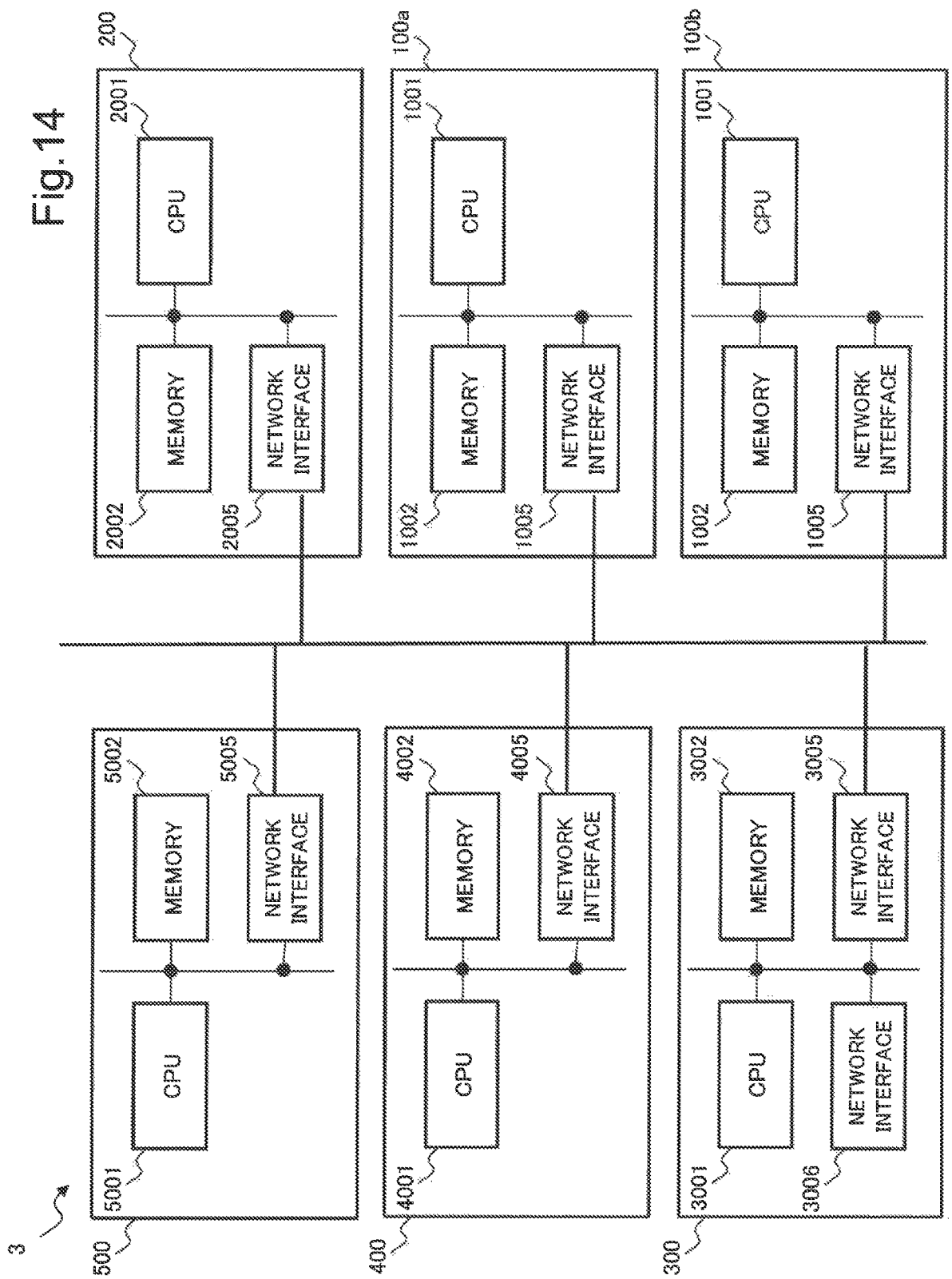
FIG. 14 is a diagram illustrating a hardware configuration example of the remote management system as the third example embodiment of the present invention.

In this case, each device constituting the remote management system 3 is configurable by hardware elements illustrated in FIG. 14. In FIG. 14, a hardware configuration of the servers 100*a* and 100*b*, the storage 200, the relay device 300, and the control device 400 is identical to the hardware configuration of the first example embodiment of the present invention described with reference to FIG. 3. Further, the server 500 includes a CPU 5001, a memory 5002, and a network interface 5005.

Further, each functional block of the remote management system 3 is configurable by the hardware elements described with reference to FIG. 3. Furthermore, the additional service providing unit 38 is constituted by the network interface 5005, and the CPU 5001 for reading and executing a computer program stored in the memory 5002.

Note that a hardware configuration of the remote management system 3 and each functional block thereof is not limited to the above-described configuration.

The additional service providing unit 38 provides an additional service being a function addable to a facility 90. As an example of an additional service, for example, a firewall, a virus scan, and the like are exemplified. It is desirable that these additional services are added to the facility 90 which is used by being coupled to the Internet. Further, as an example of another additional service, for example, there is a service of making the facility 90 function as a Network Attached Storage (NAS), a server of a Digital Living Network Alliance (DLNA: a registered trademark) or a client of DLNA, or the like. These additional services are addable to the facility 90 for aggregating any data. Further, as an example of yet another additional service, for example, there is a service of controlling an operation of the facility 90 by using a temperature estimated based on a weather forecast. This additional service is addable to the facility 90 having a function related to the temperature.

Specifically, for example, the additional service providing unit 38 stores in advance an application software for implementing an additional service in the facility 90. Further, the additional service providing unit 38 may execute the application software in response to a request from the facility 90, when the facility 90 to which the additional service is determined to be added is operated. Furthermore, the additional service providing unit 38 may transmit, to the facility 90, information generated by execution of the application software. Alternatively, the additional service providing unit 38 may transmit the application software to the facility 90, when the facility 90 to which the additional service is determined to be added is operated. Further, the additional service providing unit 38 may control the transmitted application software to be executed in the facility 90.

Note that the additional service providing unit 38 is configured in such a way that the additional service is provided to the facility 90 which is notified by the facility control unit 36 to be described later, and an additional service is not provided to the facility 90 which is not notified.

The facility information acquisition unit 31 acquires facility information further including information representing an additional service to be added when the facility 90 is operated, in addition to a configuration similar to the configuration of the facility information acquisition unit 21 in the second example embodiment of the present invention. Specifically, the facility information acquisition unit 31 may provide a user interface for registering an additional service that a user wishes to add without fail at a time when the facility 90 is operated, regardless of by which user the additional service is used. Such a user interface is typically used by the owner of the space 9. For example, when the facility 90 being a communication terminal to be used by being coupled to the Internet is operated, it is desirable that an additional service, namely, a firewall or a virus scan is added. In view of the above, for example, when a communication terminal is registered as the facility 90, an owner of the space 9 may register a firewall and a virus scan as an additional service to be added to the facility 90.

The use information acquisition unit 33 acquires facility information further including information representing an additional service to be added to the facility 90 which is operated during a use period, in addition to a configuration similar to the configuration of the use information acquisition unit 13 in the second example embodiment of the present invention. Specifically, the use information acquisition unit 33 may provide a user interface for submitting an application for use of an additional service which a user wishes to add to the facility 90, which the user wishes to use when using the space 9. Such a user interface is typically used by a user of the space 9. For example, a user may submit an application for use of an additional service of making a television function as a DLNA server in submitting an application for use of the television being the facility 90.

The facility control unit 36 further controls the additional service providing unit 38 to provide an additional service to be added to the facility 90 to be operated, based on facility information and use information, in addition to a configuration similar to the configuration of the facility control unit 26 in the second example embodiment of the present invention. Specifically, in controlling the facility 90 to be operated, when there is an additional service to be added at a time when the facility 90 is used, the facility control unit 36 instructs the additional service providing unit 38 to provide the additional service. At this occasion, an additional service to be added when the facility 90 is used is acquired by referring to facility information and use information.

An operation of the remote management system 3 configured as described above is described with reference to the drawings.

Note that, since an operation of a monitoring unit 27 is similar to that in the second example embodiment of the present invention described with reference to FIG. 11, description on the operation in the present example embodiment is omitted.

Figure 15:
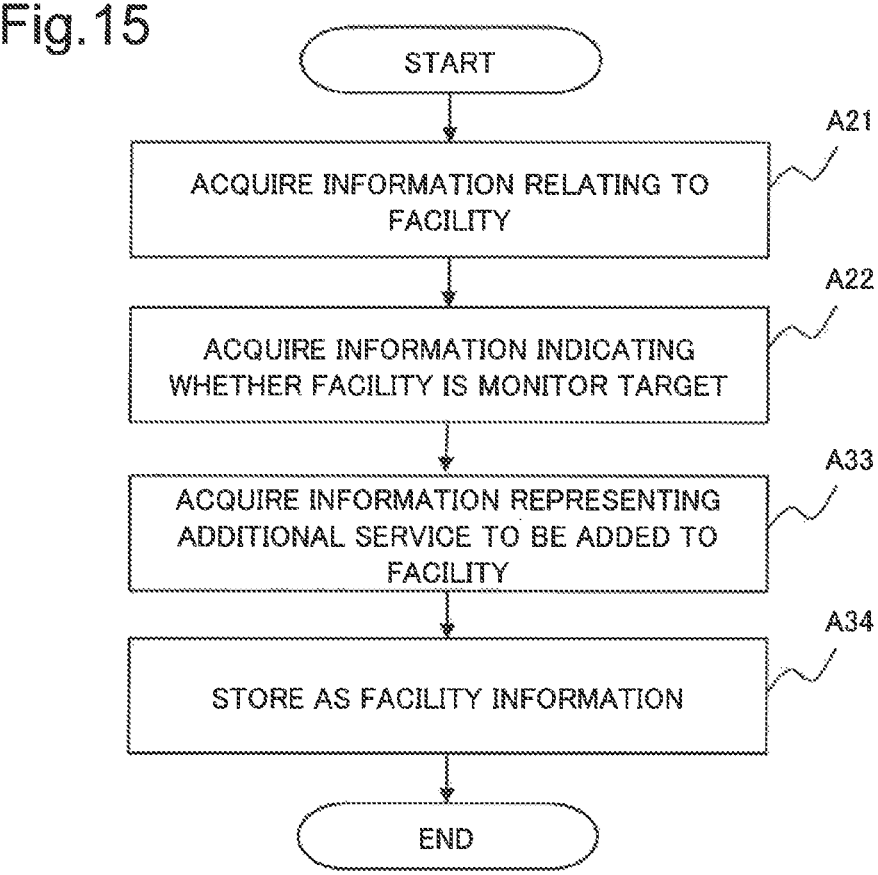
FIG. 15 is a flowchart describing an operation of acquiring facility information by the remote management system as the third example embodiment of the present invention.

FIG. 15 is a flowchart describing an operation of the facility information acquisition unit 31.

First, the facility information acquisition unit 31 performs Steps A21 to A22 similarly to the second example embodiment of the present invention. Thus, information representing the facility 90 within the space 9, and information indicating whether the facility 90 is a monitor target are acquired.

Next, the facility information acquisition unit 31 acquires information representing an additional service to be added when the facility 90 is operated (Step A33).

Next, the facility information acquisition unit 31 stores, in a facility information storage unit 12, the information acquired in Steps A21, A22, and A33, as facility information (Step A34).

Thus, the facility information acquisition unit 31 finishes the operation.

Figure 16:
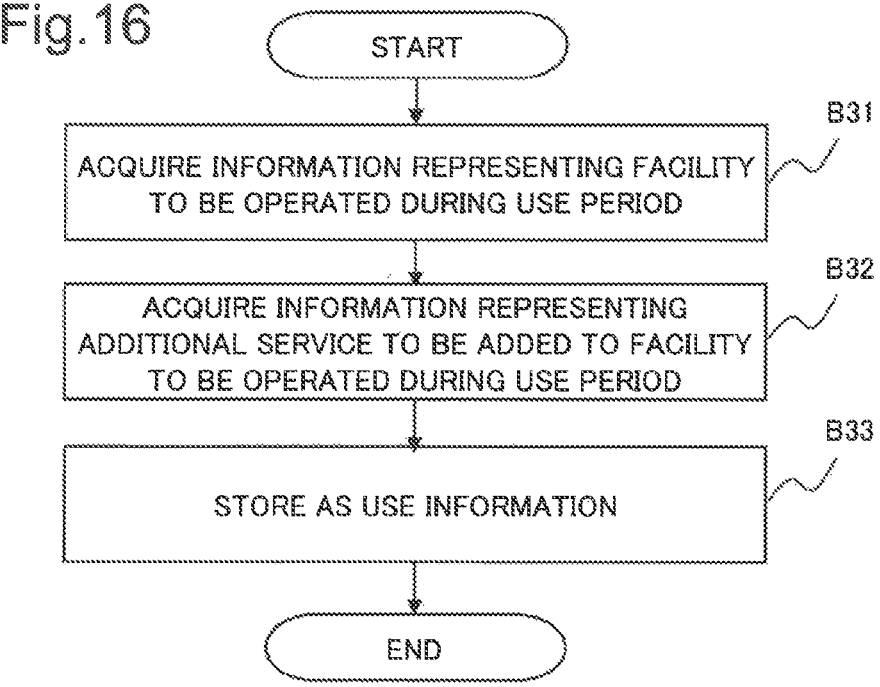
FIG. 16 is a flowchart describing an operation of acquiring use information by the remote management system as the third example embodiment of the present invention.

FIG. 16 is a flowchart describing an operation of the use information acquisition unit 33.

First, the use information acquisition unit 33 acquires information representing a facility 90, which a user wishes to operate during a use period of the space 9 (Step B31).

Next, the use information acquisition unit 33 acquires information representing an additional service, which the user wishes to add when using the associated facility 90 (Step B32).

Next, the use information acquisition unit 33 stores, in a use information storage unit 14, the information acquired in Steps B31 and B32, as use information (Step B33).

Thus, the use information acquisition unit 33 finishes the operation.

FIG. 17 is a flowchart describing an operation of controlling a facility 90 by the facility control unit 36.

First, the facility control unit 36 performs Steps C11, C12, and C23 similarly to the second example embodiment of the present invention. Thus, information for controlling a facility 90 serving as a control target to operate or not to operate is transmitted.

Next, when control to operate is performed in Step C23 (Yes in Step C34), the facility control unit 36 acquires an additional service to be added, based on facility information and use information of the facility 90 (Step C35).

Herein, when there is an additional service to be added (Yes in Step C36), the facility control unit 36 instructs the additional service providing unit 38 to provide the facility 90 with the additional service (Step C37). Thus, the facility control unit 36 finishes the operation.

Further, when control not to operate is performed in Step C23 (No in Step C34), the facility control unit 36 finishes the operation. Further, also when there is no additional service added in Step C35 (No in Step C36), the facility control unit 36 finishes the operation.

Next, advantageous effects of the third example embodiment of the present invention are described.

A remote management system as the third example embodiment of the present invention is able to enhance a function of a necessary facility, each time a space is temporarily used, without a need of installing a dedicated device within the space.

A reason for this is described. The present example embodiment is configured as follows, in addition to a configuration similar to the configuration of the second example embodiment of the present invention. Specifically, an additional service providing unit provides an additional service being a function which is addable to a facility. Further, a facility information acquisition unit acquires facility information further including information representing an additional service to be added at a time when a facility is used, and stores the facility information in a facility information storage unit. Furthermore, a use information acquisition unit acquires use information further including information representing an additional service to be added at a time when a facility is used, and stores the use information in a use information storage unit. Moreover, a facility control unit further controls the additional service providing unit to provide the additional service to be added to the facility to be operated, based on the facility information and the use information.

In this way, by employing the present example embodiment, the owner of a space is allowed to register an additional service which the owner wishes to add without fail at a time when a facility within the space is operated, and a user of the space is allowed to register an additional service which the user wishes to add to a facility which the user wishes to use during a use period of the space. Further, the present example embodiment is able to add the additional service in operating the facility for which an application for use is submitted, during the use period of the space. Thus, the present example embodiment allows the owner of a space or a service provider to operate a facility necessary for a user, without a need of a cumbersome operation, each time the space is temporarily used, and enhance a function of the facility. Consequently, the present example embodiment is also advantageous in an operation such as adding a fee depending on an operated facility and an additional service, while suppressing basic fee of a space.

Note that, as an example of an additional service in the present example embodiment, functions such as a firewall, a virus scan, NAS, a DLNA server, a DLNA client, and the like are exemplified. An additional service, however, is not limited to these functions.

Further, as described with reference to FIG. 7, the above-described first example embodiment of the present invention describes that a facility information acquisition unit and a use information acquisition unit may be configured in such a way as to acquire facility information or use information via an external network such as the Internet. Likewise, also in the second and third example embodiments of the present invention, a facility information acquisition unit and a use information acquisition unit may be configured in such a way as to acquire facility information and use information via an external network such as the Internet.

Further, each of the above-described example embodiments of the present invention mainly describes an example in which functional blocks of a remote management system are disposed to be distributed among a plurality of devices. One aspect of the present invention, however, is not limited to the above. A part or an entirety of functional blocks of a remote management system may be implemented on a same device. For example, a facility information storage unit and a use information storage unit may be disposed on a same server.

Furthermore, the above-described second and third example embodiments describe an example in which all functional blocks constituting a remote management system are coupled to a first closed area network. However, in each example embodiment, at least a relay unit and a facility control unit may be coupled to a first closed area network. Thus, a facility control unit is able to control a facility to operate or not to operate within a same closed area network. In this case, each of a relay unit and a facility control unit may be coupled to another functional block with which communication is necessary via another network.

Further, each of the above-described example embodiments of the present invention mainly describes an example in which each functional block of a remote management system is implemented by a CPU for executing a computer program stored in a memory. One aspect of the present invention, however, is not limited to the above. A part or an entirety of functional blocks, or a combination of these functional blocks may be implemented by a dedicated hardware.

Furthermore, in each of the above-described example embodiments of the present invention, an operation of a remote management system described with reference to each flowchart is stored in a storage device (storage medium) of a computer device, as a computer program according to one aspect of the present invention. Further, the CPU may read and execute the computer program. Then, in such a case, one aspect of the present invention is constituted by codes of the computer program or a storage medium.

Moreover, each of the above-described example embodiments may be implemented by combination as necessary.

Further, one aspect of the present invention is not limited to the above-described example embodiments, and may be implemented in accordance with various aspects.

Furthermore, a part or an entirety of the above-described example embodiments may be described as the following supplementary notes, but are not limited to the following.
(Supplementary Note 1)

A remote management system including:

a facility information acquisition unit for acquiring facility information representing a facility within a space;

a facility information storage unit for storing the facility information;

a use information acquisition unit for acquiring use information representing a facility to be operated during a use period of the space among facilities represented by the facility information;

a use information storage unit for storing the use information;

a relay means for relaying communication between the facility within the space and an outside of the space; and a facility control unit for controlling the facility to operate or not to operate via the relay unit, based on the facility information and the use information.
(Supplementary Note 2)

The remote management system according to supplementary note 1, wherein the facility control unit and the relay unit are coupled to a first closed area network, the relay unit performs the relaying via a virtual circuit for virtually and directly coupling the first closed area network, and a second closed area network to which the facility is coupled within the space, and the facility control unit controls the facility to operate or not to operate within a same closed area network configured by virtually and directly coupling the first and second closed area networks.
(Supplementary Note 3)

The remote management system according to supplementary note 1 or 2, further including an additional service providing unit for providing an additional service being a function addable to the facility, wherein the facility control unit further controls the additional service providing unit to provide the additional service to be added to the facility to be operated.

(Supplementary Note 4)

The remote management system according to supplementary note 3, wherein the facility information acquisition unit acquires the facility information further including information representing the additional service to be added at a time when the facility is operated, and the facility control unit controls the additional service providing unit to provide the additional service, based on the facility information.

(Supplementary Note 5)

The remote management system according to supplementary note 3 or 4, wherein the use information acquisition unit acquires the use information further including information representing the additional service to be added to the facility to be operated during the use period, and the facility control unit controls the additional service providing unit to provide the additional service, based on the use information.

(Supplementary Note 6)

The remote management system according to any one of supplementary notes 1 to 5, further including a monitoring unit for determining whether a location of the facility is normal, based on a communication status with the facility as a monitor target via the relay unit.

(Supplementary Note 7)

The remote management system according to supplementary note 6, wherein the facility information acquisition unit acquires the facility information further including information indicating whether the facility is the monitor target.

(Supplementary Note 8)

A control device including the facility control unit in the remote management system according to any one of supplementary notes 1 to 7.

(Supplementary Note 9)

A server including the facility information acquisition unit in the remote management system according to any one of supplementary notes 1 to 7.

(Supplementary Note 10)

A server including the use information acquisition unit in the remote management system according to any one of supplementary notes 1 to 7.

(Supplementary Note 11)

A method including, by a computer device:

acquiring and storing facility information representing a facility within a space;

acquiring and storing use information representing a facility to be operated during a use period of the space among facilities represented by the facility information; and controlling the facility to operate or not to operate, based on the facility information and the use information, via a relay unit for relaying communication between the facility within the space and an outside of the space.

(Supplementary Note 12)

A method including, by a computer device, controlling, based on facility information representing a facility within a space, and use information representing a facility to be operated during a use period of the space among facilities represented by the facility information, the facility to operate or not to operate, via a relay unit for relaying communication between the facility within the space and an outside of the space.

(Supplementary Note 13)

A method including, by a computer device, acquiring and storing facility information representing a facility within a space.

(Supplementary Note 14)

A method including, by a computer device, acquiring and storing use information representing a facility to be operated during a use period of the space among facilities represented by the facility information stored by the method according to supplementary note 13.

(Supplementary Note 15)

A program that causes a computer device to execute a step of controlling, based on facility information representing a facility within a space, and use information representing a facility to be operated during a use period of the space among facilities represented by the facility information, the facility to operate or not to operate, via a relay unit for relaying communication between the facility within the space and an outside of the space.

(Supplementary Note 16)

A program that causes a computer device to execute steps of acquiring and storing facility information representing a facility within a space.

(Supplementary Note 17)

A program that causes a computer device to execute steps of acquiring and storing use information representing a facility to be operated during a use period of the space among facilities represented by facility information stored by execution of the program according to supplementary note 16.

In the foregoing, one aspect of the present invention is described by using the above-described example embodiments as an exemplary example. One aspect of the present invention, however, is not limited to the above-described example embodiments. Specifically, one aspect of the present invention is applicable to various aspects comprehensible to a person skilled in the art within the scope of one aspect of the present invention.

INDUSTRIAL APPLICABILITY

One aspect of the present invention is appropriate for use in controlling whether use of an installed facility is allowed in a space to be temporarily used, such as a rental room, a share house, a hospital, a hotel, a rental office, and an event space.

REFERENCE SIGNS LIST

1, 2, 3 Remote management system
11, 21, 31 Facility information acquisition unit
12 Facility information storage unit
13, 33 Use information acquisition unit
14 Use information storage unit
15, 25 Relay unit
16, 26, 36 Facility control unit
27 Monitoring unit
38 Additional service providing unit
90 Facility
100*a*, 100*b*, 500 Server
200 Storage
300 Relay device
400 Control device
1001, 2001, 3001, 4001, 5001 CPU
1002, 2002, 3002, 4002, 5002 Memory
1005, 2005, 3005, 3006, 4005, 5005 Network interface

The invention claimed is:

1. A remote management system comprising:
a facility information receiver that receives facility information representing a facility within a space;
a facility information storage that stores the facility information;
a use information receiver that receives use information representing a facility to be operated during a use period of the space among facilities represented by the facility information;
a use information storage that stores the use information;
a relay that relays communication between the facility within the space and an outside of the space; and
a facility controller that controls the facility to operate or not to operate via the relay, based on the facility information and the use information, wherein
the facility controller and the relay are coupled to a first closed area network,
the relay performs the relaying via a virtual circuit for virtually and directly coupling the first closed area network, and a second closed area network to which the facility is coupled within the space, and
the facility controller controls the facility to operate or not to operate within a same closed area network configured by virtually and directly coupling the first and second closed area networks.

2. The remote management system according to claim 1, further comprising additional service provider provides an additional service being a function addable to the facility, wherein
the facility controller further controls the additional service provider to provide the additional service to be added to the facility to be operated.

3. The remote management system according to claim 2, wherein
the facility information receiver receives the facility information further including information representing the additional service to be added at a time when the facility is operated, and
the facility controller controls the additional service provider to provide the additional service, based on the facility information.

4. The remote management system according to claim 2, wherein
the use information receiver receives the use information further including information representing the additional service to be added to the facility to be operated during the use period, and
the facility controller controls the additional service provider to provide the additional service, based on the use information.

5. The remote management system according to claim 1, further comprising
a monitor that determines whether a location of the facility is normal, based on a communication status with the facility as a monitor target via the relay.

6. The remote management system according to claim 5, wherein
the facility information receiver receives the facility information further including information indicating whether the facility is the monitor target.

7. A method comprising, by a computer device:
acquiring and storing facility information representing a facility within a space;
acquiring and storing use information representing a facility to be operated during a use period of the space among facilities represented by the facility information; and
controlling the facility to operate or not to operate, based on the facility information and the use information, via a relay that relays communication between the facility within the space and an outside of the space, wherein
the controlling the facility is performed by a facility controller and the facility controller and the relay are coupled to a first closed area network,
the relay performs the relaying via a virtual circuit for virtually and directly coupling the first closed area network, and a second closed area network to which the facility is coupled within the space, and
the facility controller controls the facility to operate or not to operate within a same closed area network configured by virtually and directly coupling the first and second closed area networks.

8. A non-transitory computer-readable recording medium recording a program causing a computer device to execute
acquiring facility information representing a facility within a space, and use information representing a facility to be operated during a use period of the space among facilities represented by the facility information, and
controlling, based on the facility information and the use information, the facility to operate or not to operate, via relay that relays communication between the facility within the space and an outside of the space, wherein
the controlling the facility is performed by a facility controller and the facility controller and the relay are coupled to a first closed area network,
the relay performs the relaying via a virtual circuit for virtually and directly coupling the first closed area network, and a second closed area network to which the facility is coupled within the space, and
the facility controller controls the facility to operate or not to operate within a same closed area network configured by virtually and directly coupling the first and second closed area networks.

* * * * *